(12) United States Patent
Talpe

(10) Patent No.: US 8,567,011 B2
(45) Date of Patent: *Oct. 29, 2013

(54) DOOR CLOSING MECHANISM

(76) Inventor: Joseph Talpe, Heestert-Zwevegem (BE)

( * ) Notice: Subject to any disclaimer, the term of this patent is extended or adjusted under 35 U.S.C. 154(b) by 117 days.

This patent is subject to a terminal disclaimer.

(21) Appl. No.: 13/128,752

(22) PCT Filed: Aug. 27, 2009

(86) PCT No.: PCT/EP2009/061079
§ 371 (c)(1),
(2), (4) Date: May 11, 2011

(87) PCT Pub. No.: WO2010/054867
PCT Pub. Date: May 20, 2010

(65) Prior Publication Data
US 2011/0214354 A1 Sep. 8, 2011

(30) Foreign Application Priority Data

Nov. 14, 2008 (EP) .................................... 08169208
Nov. 14, 2008 (EP) .................................... 08169211

(51) Int. Cl.
*E05F 3/22* (2006.01)
(52) U.S. Cl.
USPC ............................ 16/54; 16/58; 16/68; 16/50
(58) Field of Classification Search
USPC ............. 16/50, 54, 68, 58, 71, 78, 80, 49, 51, 16/318, 319, 280, 281, 310, 316, 317
See application file for complete search history.

(56) References Cited

U.S. PATENT DOCUMENTS

| 1,952,902 | A |   | 3/1934 | Barros |       |
|-----------|---|---|--------|--------|-------|
| 2,164,358 | A | * | 7/1939 | Stannard | 16/54 |
| 4,100,646 | A | * | 7/1978 | Schubeis | 16/54 |
| 4,391,020 | A | * | 7/1983 | Hsu | 16/314 |
| 4,413,373 | A | * | 11/1983 | Sasaki | 16/54 |
| 4,825,503 | A | * | 5/1989 | Shiramasa et al. | 16/52 |

(Continued)

FOREIGN PATENT DOCUMENTS

| AT |       393004 B | 7/1991 |
|----|----------------|--------|
| DE |       516627 C | 1/1931 |
| DE | 102005055558 A1 | 5/2007 |
| GB |      1602914 A | 11/1981 |

*Primary Examiner* — Chuck Mah
(74) *Attorney, Agent, or Firm* — Sughrue Mion, PLLC

(57) ABSTRACT

The present invention relates to an actuator (1), comprising an output member (6); a resilient element (8) connected to said output member (6) so as to urge it in a first direction; and an hydraulic rotation damper (5) with a closed cylinder cavity, a rotational damper shaft which extends into the cylinder cavity, and a piston dividing the cylinder cavity into a first side and a second side. Within the rotation damper (5), the rotational movement of the damper shaft is converted into a translational movement of the piston along a longitudinal axis of the shaft. A restricted fluid passage communicates said first and second sides. The damper shaft is connected over a gearing (10, 15, 17) to the output member (6) and resilient element (8) of the actuator for damping movement of said output member (6) in said first direction.

The present invention relates to both rotational and linear actuators as well as to a closing mechanisms for hinged members, such as doors, gates, or windows, comprising such actuators.

19 Claims, 20 Drawing Sheets

(56) References Cited

U.S. PATENT DOCUMENTS

| | | | |
|---|---|---|---|
| 4,829,628 A * | 5/1989 | Vuksic | 16/54 |
| 4,995,194 A * | 2/1991 | Schultze et al. | 49/32 |
| 5,414,894 A * | 5/1995 | Fayngersh | 16/52 |
| 5,419,013 A * | 5/1995 | Hsiao | 16/319 |
| 6,205,619 B1 * | 3/2001 | Jang | 16/352 |
| 6,854,161 B2 * | 2/2005 | Lee | 16/50 |
| 2004/0068833 A1 * | 4/2004 | Sawa | 16/60 |
| 2010/0263289 A1 * | 10/2010 | Sawa | 49/386 |

* cited by examiner

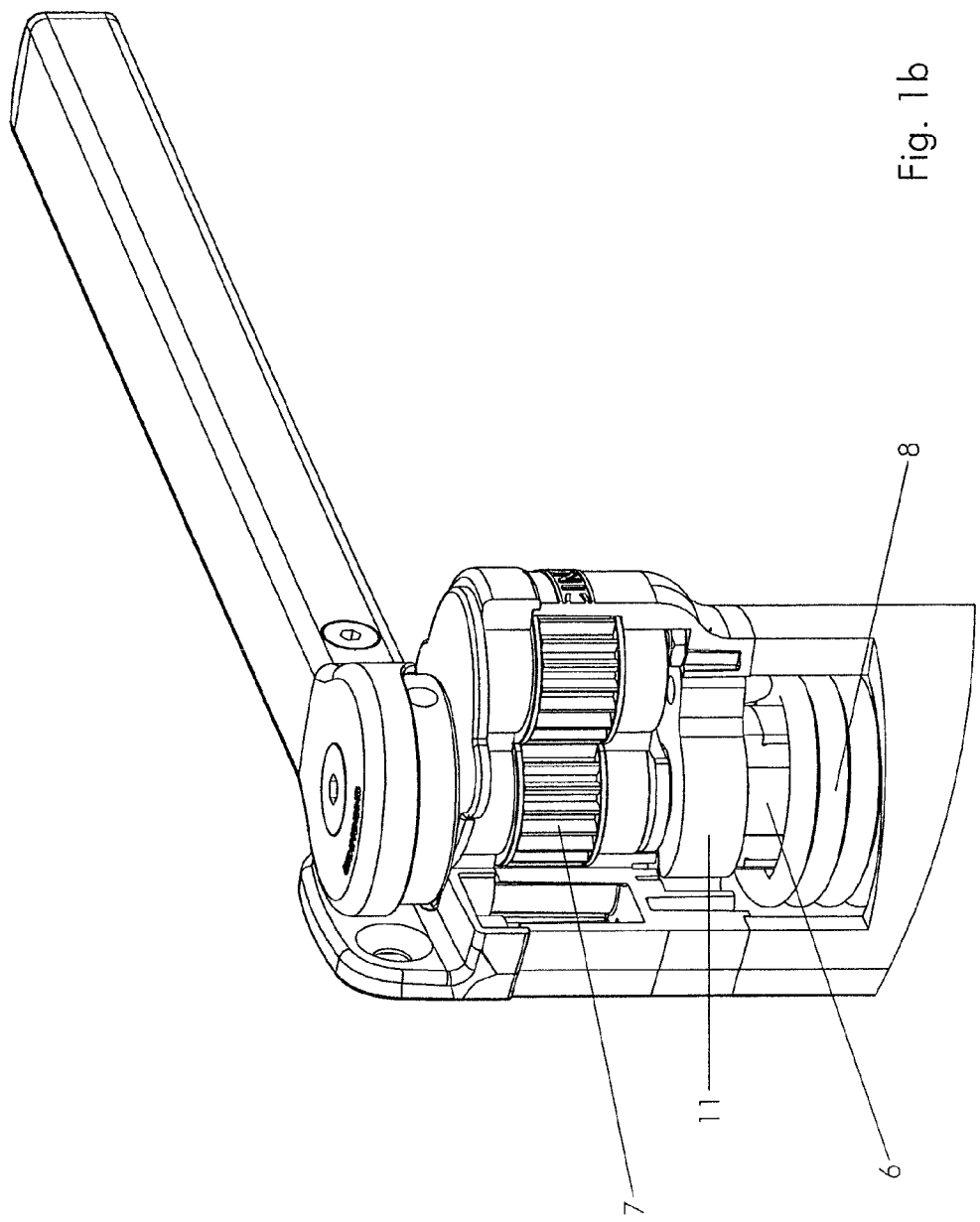

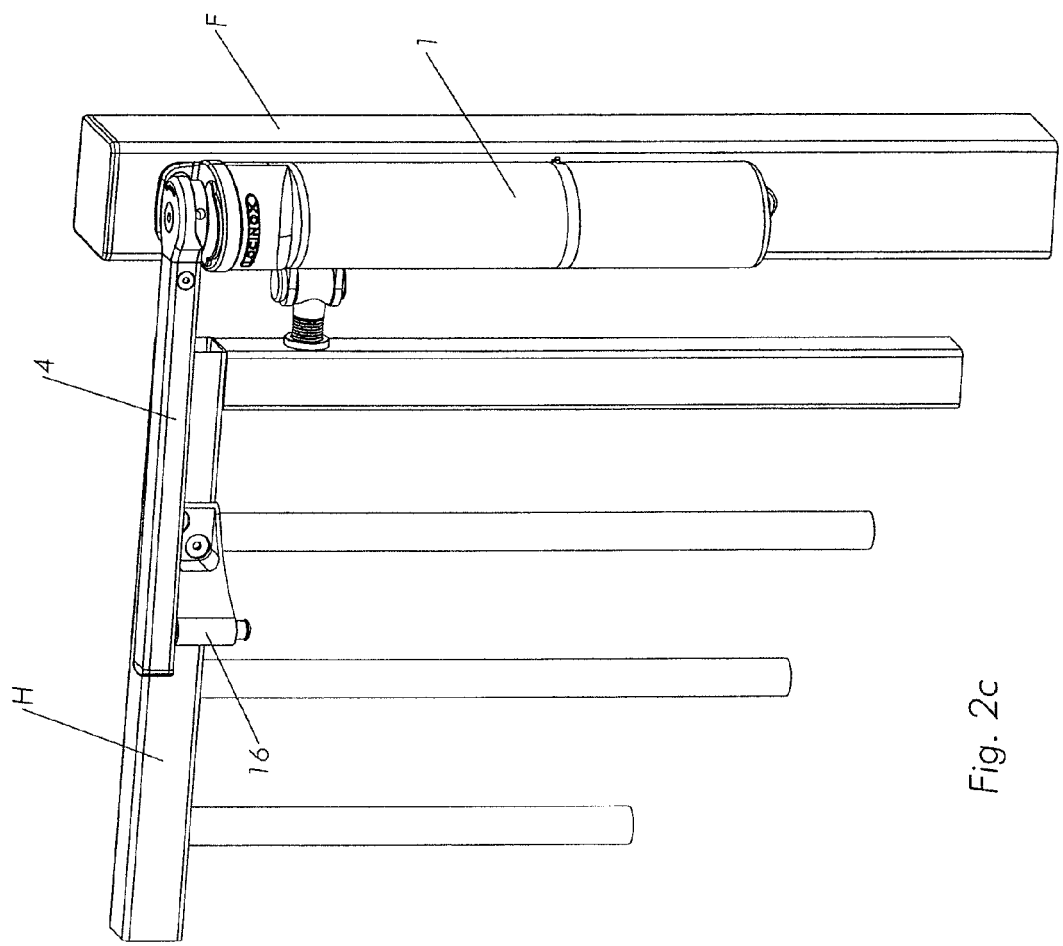

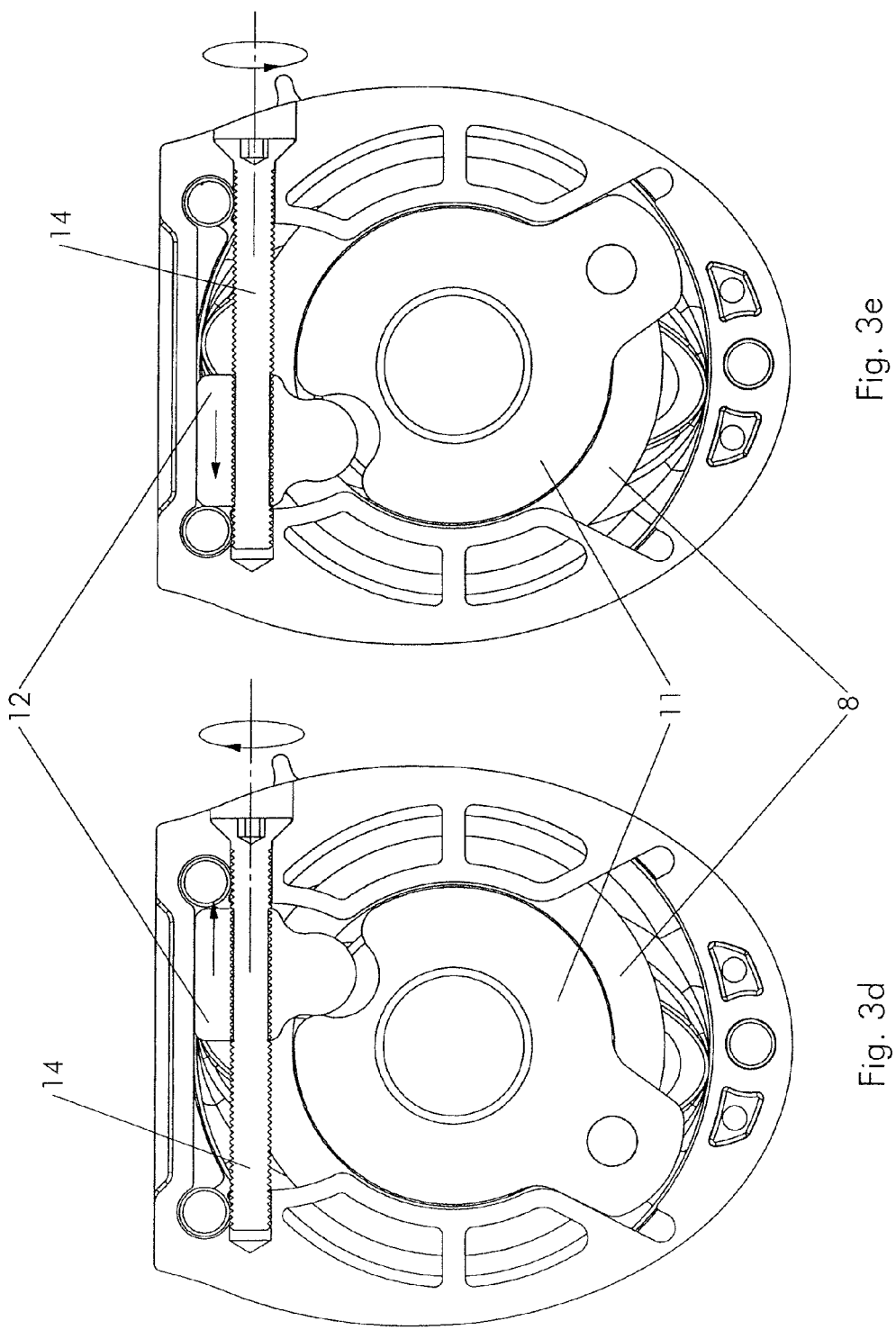

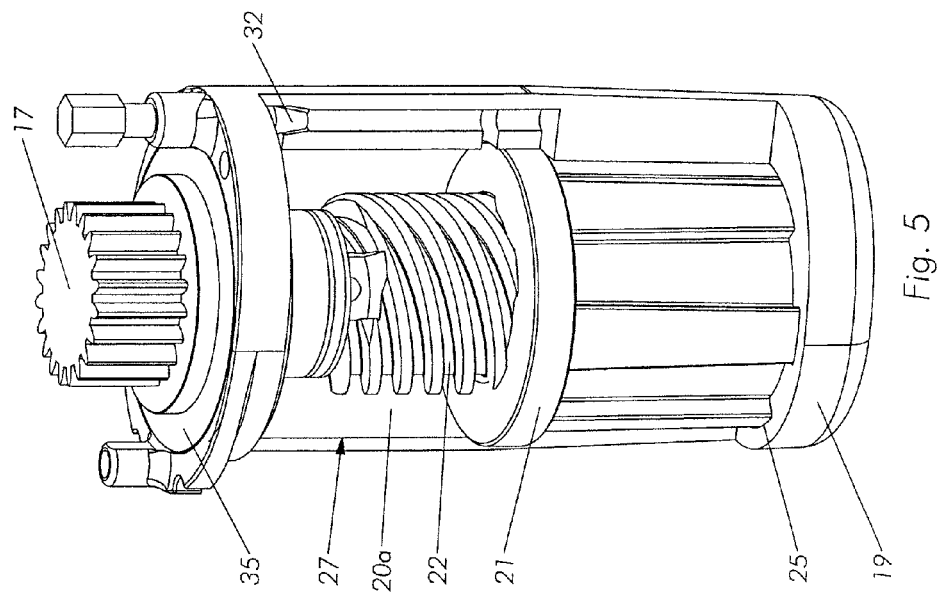
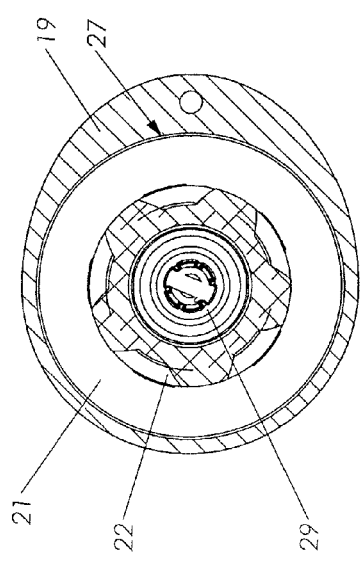
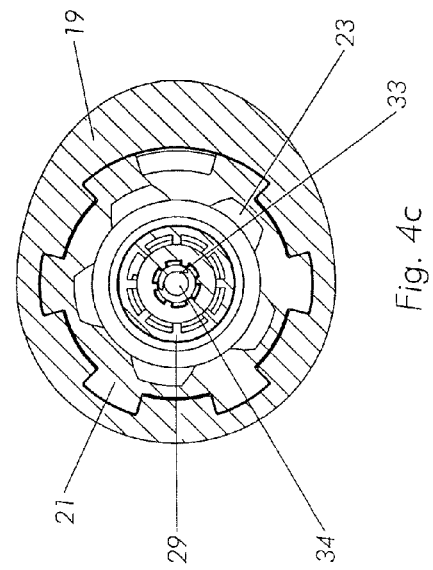

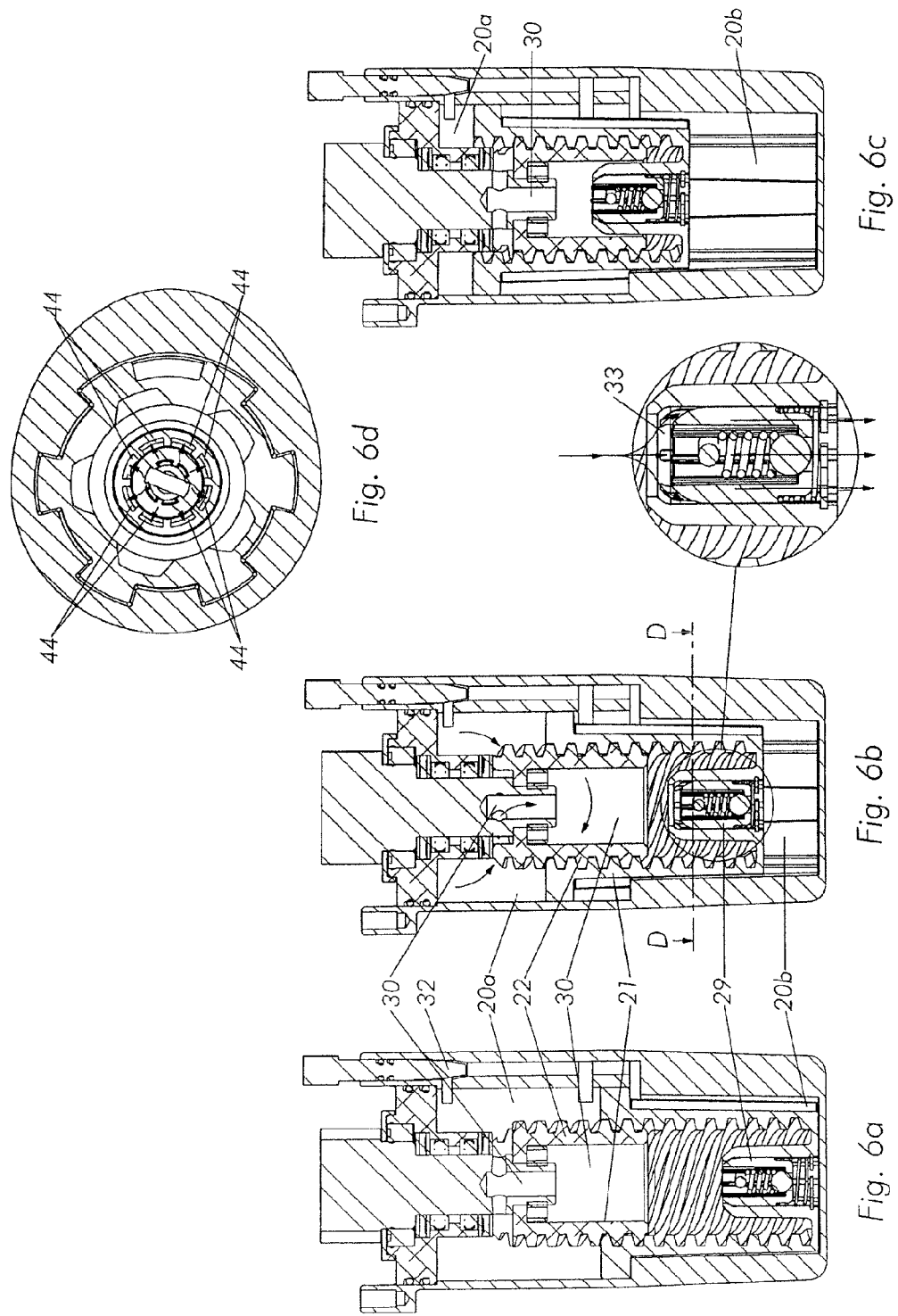

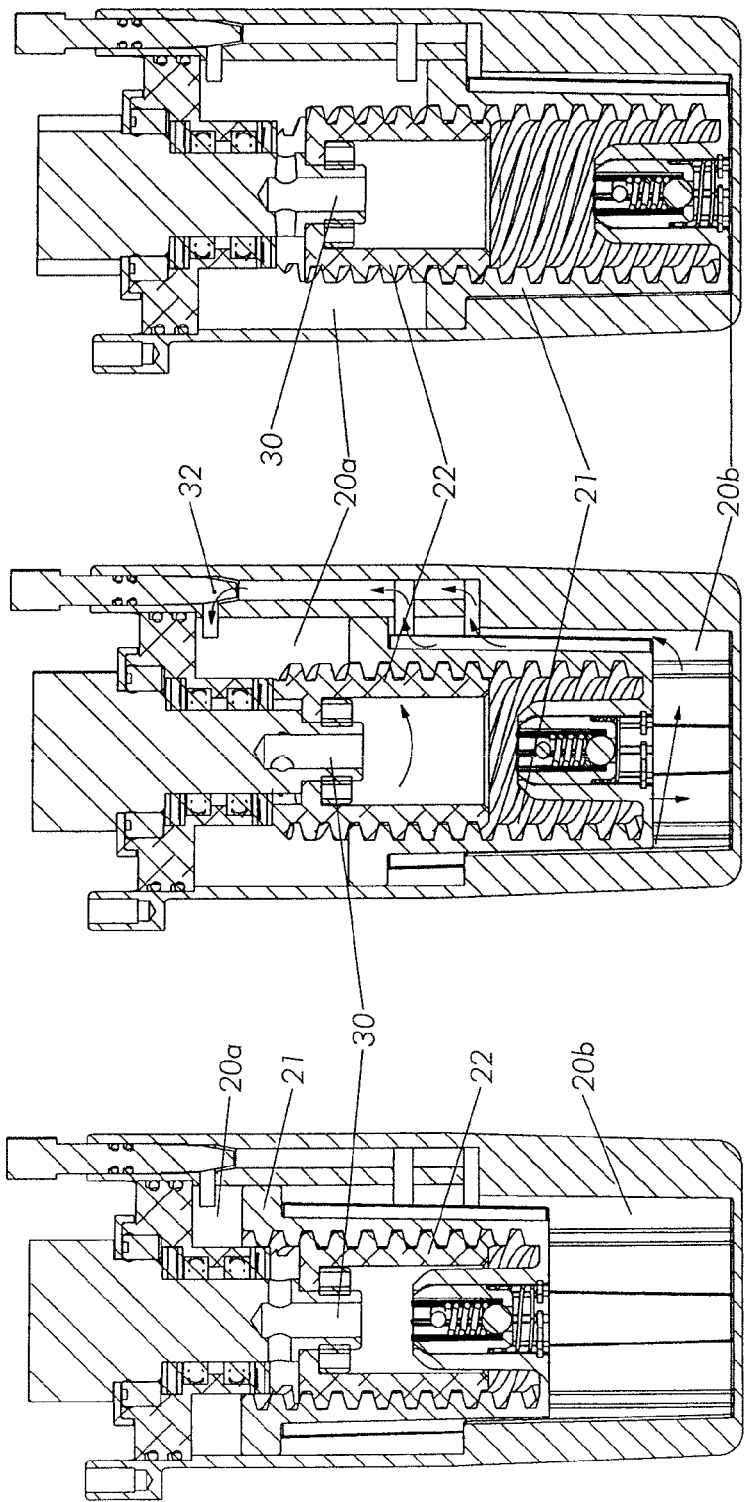

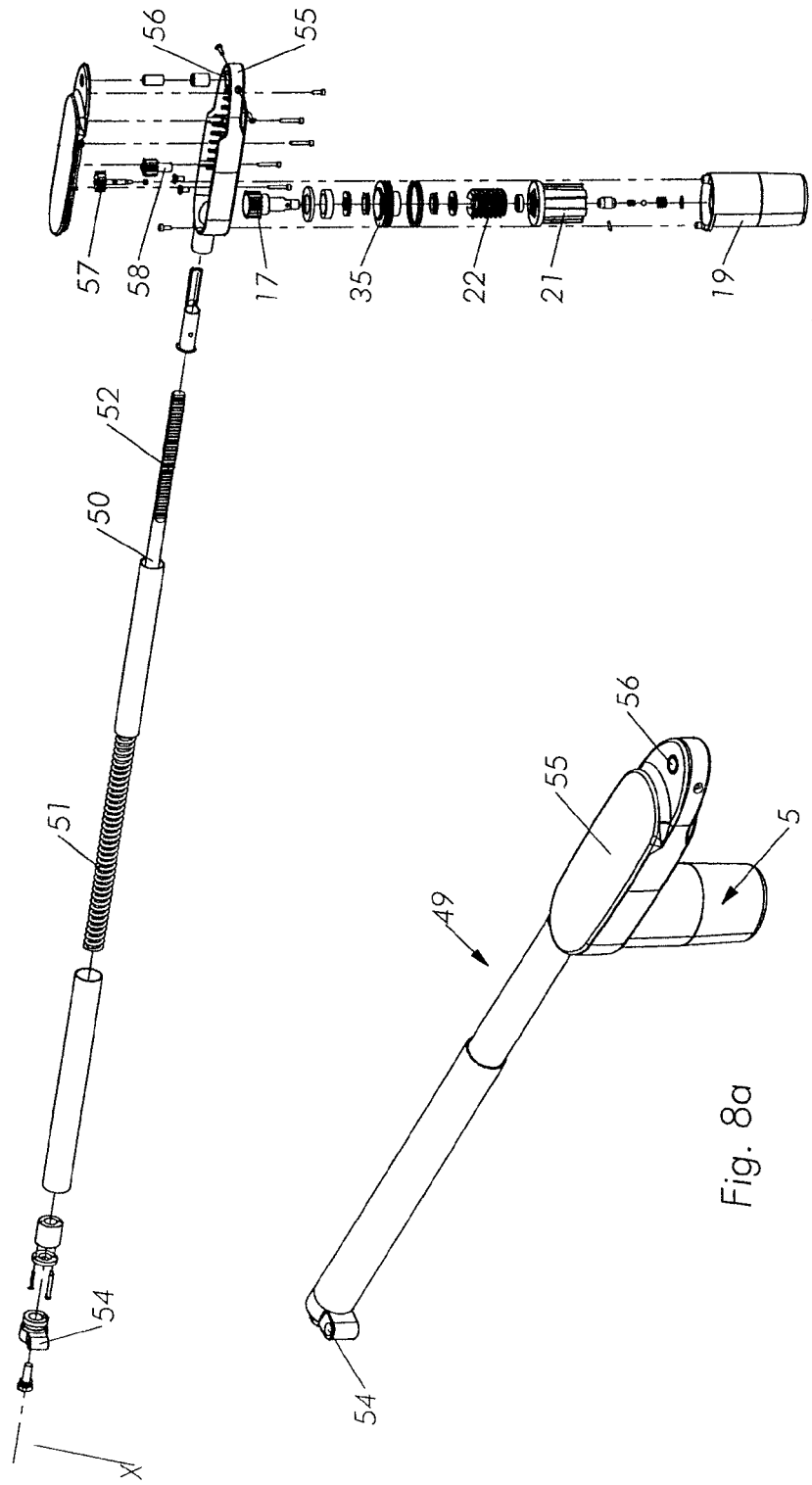

DOOR CLOSING MECHANISM

CROSS REFERENCE TO RELATED APPLICATIONS

This application is a National Stage of International Application No. PCT/EP2009/061079 filed Aug. 27, 2009, which claims priority from European Patent Application Nos. 08169211.3 and 08169208.9, both filed Nov. 14, 2008, the contents of all of which are incorporated herein by reference in their entirety.

BACKGROUND OF THE INVENTION

The present invention relates to an actuator comprising an output member, a resilient element connected to said output member so as to urge it in a first direction, and a hydraulic rotation damper.

Such damped actuators are well-known in the art. In particular, such actuators are used in closing mechanisms for hinged members, such as doors, gates or windows, to effect automatic closure of the hinged closure member without slamming. Such hydraulic components are however delicate and usually badly suited for outdoors use. They are more particularly quite sensitive to temperature variations and are also often subject to leakage problems.

Examples of such actuators were disclosed, for example in U.S. Pat. No. 4,825,503 and UK Patent Application GB 2 252 790. These actuators, using a rotation damper with a rotating piston, do however present several drawbacks. The rotation damper has an angular travel of less than 360° and is directly coupled to the actuator output, without any multiplication stages. Since in this application it is important for the damper to be as compact and unobtrusive as possible, the area of the piston is necessarily limited. To achieve the required damping torques, comparatively high hydraulic pressures will thus be required. This makes it more difficult to prevent leaking, in particular through the damping adjustment valve, which is in fluid connection with the high-pressure side of the damper.

A further drawback is that it is difficult to achieve a good contact between the rotating piston and the inner wall of the cylinder. In fact, the rotating piston is formed by a rotating vane which has a free edge engaging the inner wall of the cylinder. Manufacturing such a vane and rotatably mounting it into the cylinder so that it fits exactly against the inner side of the cylinder, is a quite complex operation. Consequently, the production of the damper is relatively expensive and since the rotating piston will usually not fit exactly against the inner wall of the cylinder the hydraulic fluid has to be sufficiently viscous to be able to produce the required high pressure. A drawback of such viscous fluids is that their viscosity is usually quite strongly dependent on the temperature so that the known dampers are not appropriate for outdoor applications.

As an alternative, a different type of actuator has been disclosed in U.S. Pat. No. 4,097,957. This actuator is arranged for automatically closing a sliding type door. It comprises a fixed damper shaft and a cylinder barrel rotating together with the piston around the damper shaft. The rotation of the piston is converted into a translational motion thereof over a nut-and-screw transmission between the piston and the damper shaft. Rotation of the piston and cylinder barrel is achieved by means of a belt wound around the outside of the cylinder barrel. The travel of this rotation damper is thus not limited to an angle smaller than 360°. On the contrary, the cylinder barrel rotates several times around the damper shaft when the sliding door is opened or closed as a result of the relatively small outer diameter of the cylinder barrel. The closing force is obtained by a spiral spring which is arranged between the rotating cylinder barrel and the fixed damper shaft and which is wound up when opening the sliding door.

A drawback of the actuator disclosed in U.S. Pat. No. 4,097,957 is that for a given size of the spiral spring, which is limited by the dimensions of the actuator, the closing force (torque) which is exerted by the spring to effect closure of the closure member is limited due to the fact that it has to be able to be wound up and unwound over a number of rotations. In other words, the spring has to be a relatively weak spring so that it cannot assure a reliable closing of the closure member (sliding type door).

A damper which comprises a rotating damper shaft which is screwed into a piston so that the rotation of the damper shaft is converted into a translational movement of the piston within the cylinder barrel is disclosed in AT 393 004. This damper is however not an actuator since it doesn't comprise a resilient element. Moreover, an important disadvantage of this damper is that, in order to achieve a sufficiently large displacement of the piston in the cylinder, the threads on the damper shaft must have a very large pitch, namely a pitch which is so large that only a rotation of about 180° of the damper shaft is needed to displace the piston from its uppermost to its lowermost position in the cylinder. Such a large step causes high frictional forces which hamper the opening or closing of the closure member, especially when the hydraulic fluid within the damper is under a high pressure.

SUMMARY OF THE INVENTION

It is an object of the present invention to provide a hydraulically damped actuator that is particularly adapted for closing mechanisms for hinged members and that it able to assure a reliable operation.

To this object, in an actuator according to the invention, the hydraulic rotation damper comprises a closed cylinder cavity within a cylinder barrel; a rotational damper shaft which extends into the cylinder cavity; a piston dividing the cylinder cavity into a first side and a second side, and comprising at least one helical thread in engagement with a corresponding thread on either the cylinder barrel or the damper shaft, and a rotation-preventing member in engagement with a guide on the other one of said damper shaft or cylinder barrel, so that a rotational motion of the shaft with respect to the cylinder barrel results in a translational motion of the piston along a longitudinal axis of the shaft; and a restricted fluid passage between said first and second sides; wherein that said damper shaft is connected over a gearing to the output member and the resilient element of the actuator for damping movement of said output member in said first direction.

Since closing mechanisms for hinged members normally do not require more than 360° of travel for the hinged member, and usually less than 180°, interposing a gearing between such an hydraulic rotation damper and the output member of the actuator allows to convert its large angular travel into a higher damping torque, thus resulting into an efficient, yet compact and substantially leak-free, damped actuator. Moreover, since the gearing is also interposed between the damper shaft and the resilient element, this resilient element has to be able to be tensioned over a smaller travel so that a stronger resilient element can be used producing a higher closing force and thus a more reliable operation of the actuator.

In a first embodiment of the invention, said output member is a rotational output shaft, said resilient element being connected to said output shaft so as to urge it in one direction around an axis of rotation.

It is a further object of the present invention to provide a rotational actuator which can be adapted for operating in either direction of rotation around an axis.

To this object, the actuator may comprise a first rotational output directly connected to an output member, and a second rotational output connected to said output member over a reversing gearing.

Advantageously, the actuator may comprise an output arm connectable to either one of said first or second rotational outputs.

Even more advantageously, said output arm may be connectable to either one of said first or second rotational output with an adjustable angular position.

In a second embodiment of the invention, said output member is a pushrod, said resilient element being connected to said pushrod so as to urge it in one direction along an axis of translation, and said output member being connected to said damper shaft over a rack-and-pinion gearing.

It is a further object of the present invention to provide a unidirectionally damped actuator wherein leakage is substantially prevented.

To this purpose, said cylinder barrel has a top and a bottom, said rotational damper shaft extending into the cylinder cavity through an opening at said top of the cylinder barrel, the bottom being substantially closed, said first side of the cylinder cavity being above the piston, and said second side of the cylinder cavity being below the piston; and further comprising a one-way valve allowing fluid flow from said first side to said second side of the cylinder cavity. Higher pressures will thus be reached in the second side than in the first side, as the first side will exhaust towards the second side through the one-way valve when the piston moves upwards, opposing less resistance than the second side when the piston moves downwards. However, since the bottom of the cylinder barrel, enclosing the higher-pressure second side of the cylinder cavity, will be substantially closed, leaks from this high-pressure side will be contained.

It is a further object of the present invention to provide an actuator with adjustable damping, yet substantially leak-resistant.

To this object, said fluid passage between the first and second sides of the cylinder cavity may comprise a flow restrictor, in particular in the form of a needle valve, adjustable through an orifice in the cylinder barrel, wherein said second side of the cylinder cavity and said orifice are at opposite sides of the flow restrictor, and said orifice preferably opens towards said top of the cylinder barrel. The orifice is thus isolated from the high fluid pressures in said second side of the cylinder barrel.

In the hydraulic rotation damper of U.S. Pat. No. 4,097,957, the second, high-pressure side of the cylinder is not completely enclosed by the cylinder barrel because the latter presents an opening for the needle of a needle valve for adjusting the flow of hydraulic fluid between the first and second sides, and thus the damping characteristics of the rotation damper. Since said opening leads directly to that second, high-pressure side of the cylinder cavity, hydraulic fluid leaks through the sliding joint between the needle and the opening wall are likely, despite a shaft seal, more particularly an O-ring seal, around said needle. In particular, if the needle valve is moved towards a more restricted position, an amount of hydraulic fluid will necessarily slip across the moving seal.

It is a further object of the present invention to provide a hydraulic damper which is protected against too high stresses in the damper or in the actuator which comprises the damper.

To this purpose, the rotation damper of the invention may advantageously be provided with a relief or safety valve allowing fluid flow from said second side to said first side of the cylinder cavity, set to open when an overpressure in said second side exceeds a predetermined threshold, and close again once said overpressure falls back under the same, or a lower threshold. The overpressure required to open the relief valve is higher than the pressure which is required to open the one-way valve to allow fluid flow from the first to the second side since the relief valve should not open under normal conditions of use but only when the pressures would become too high whilst the one-way valve should open immediately when the piston is moved towards the first side of the cylinder cavity so that this movement is damped as little as possible. Just like the one-way valve, the relief or safety valve may also be placed in said piston, between said second side of the cylinder cavity and said piston cavity.

It is a further object of the present invention to release the damping torque near the end of travel of the actuator.

To this object, said fluid passage may comprise a bypass from a first, lower point of said cylinder cavity to a second, higher point of said cylinder cavity, around said flow restrictor. Combined with the angular adjustment of the output arm with respect to the rotational output in the rotational actuator of the first embodiment of the invention, this allows the user to adjust the angular position of the arm at which the damping force will be released.

It is another object of the present invention to provide a rotation damper with consistent damping characteristics which are not significantly affected by temperature variations.

To this object, in a rotation damper according to an embodiment of the present invention, at least at 20° C., an outer perimeter surface of said piston presents a clearance fit with an inner perimeter surface of the cylinder barrel to allow hydraulic fluid contained in the cylinder cavity to flow through said clearance between the piston and the cylinder barrel, with said cylinder barrel being made of at least one first material, having a first thermal expansion coefficient, and said piston of at least one second material, having a second thermal expansion coefficient, said second thermal expansion coefficient being larger than said first thermal expansion coefficient so that said clearance decreases when the temperature of the damper is raised and increases when the temperature of the damper is lowered. The thermal expansion differential between piston and cylinder barrel thus tends to open the clearance between them at lower temperatures, and close it at higher temperatures, automatically compensating for the thermal variation in viscosity of the hydraulic fluid.

It is a further object of the present invention to provide a closing mechanism for a member hinged to a structure. The present invention thus also relates to a closing mechanism for a member hinged to a structure, comprising an actuator comprising a closed cylinder cavity within a cylinder barrel; a rotational damper shaft which extends into the cylinder cavity; a piston dividing the cylinder cavity into a first side and a second side, and comprising at least one helical thread in engagement with a corresponding thread on either the cylinder barrel or the damper shaft, and a rotation-preventing member in engagement with a guide on the other one of said damper shaft or cylinder barrel, so that a rotational motion of the shaft with respect to the cylinder barrel results in a translational motion of the piston along a longitudinal axis of the shaft; and a restricted fluid passage between said first and second sides; wherein that said damper shaft is connected over a gearing to the output member of the actuator for damping movement of said output member in said first direction.

The damper shaft may also be connected to the resilient element over said gearing, but could alternatively be directly connected to the resilient element.

Advantageously, there is a multiplying ratio of at least 1.5, preferably at least 2, between a swinging motion of the hinged member and a rotation of the damper shaft. Friction losses at the interface between the rotational damper shaft and the translational piston can thus be minimised.

The terms "top", "bottom", "above", "below", "upwards", and "downwards", as used in this description, should be understood as relating to the normal orientation of these devices in use. Of course, during their production, distribution, and sale, the devices may be held in a different orientation.

BRIEF DESCRIPTION OF THE DRAWINGS

Several preferred embodiments of the invention will be described illustratively, but not restrictively, with reference to the accompanying figures, in which:

FIG. 1b is a cut detail view of the rotational actuator of FIG. 1a;

FIGS. 2a and 2b show two alternative arrangements of the rotational actuator of FIG. 1a;

FIGS. 2c and 2d respectively show each one of the above-mentioned two alternative arrangements of the rotational actuator of FIG. 1a in a gate closing mechanism;

FIG. 3 is an exploded view of the rotational actuator of FIG. 1a;

FIG. 3a is a cut view of a detail of the rotational actuator of FIG. 1a;

FIG. 3b is an internal detail view of the rotational actuator of FIG. 1a;

FIG. 3c is an external detail view of the rotational actuator of FIG. 1a;

FIGS. 3d and 3e are transversal sections of the rotational actuator of FIG. 3c along line D-D at different preload positions;

FIG. 4a is a longitudinal section of the rotation damper of the actuator of FIG. 1a;

FIGS. 4b and 4c are transversal sections of the rotation damper of FIG. 4a, along, respectively, lines B-B, and C-C;

FIG. 5 is a perspective view of the rotation damper of FIG. 4a;

FIGS. 6a-c are further longitudinal sections of the rotation damper of FIG. 4a, with the damper shaft in a clockwise rotation and the piston in an upwards motion;

FIG. 6d is a transversal section of the rotation damper of FIG. 6b along line D-D;

FIGS. 7a-c are longitudinal sections of the rotation damper of FIG. 4a, with the damper shaft in a counter-clockwise rotation and the piston in a downwards motion;

FIG. 8a is a perspective view of a linear actuator according to a second embodiment of the invention;

FIG. 8b is an exploded perspective view of the actuator of FIG. 8a;

DETAILED DESCRIPTION OF THE INVENTION

Figure 1A:
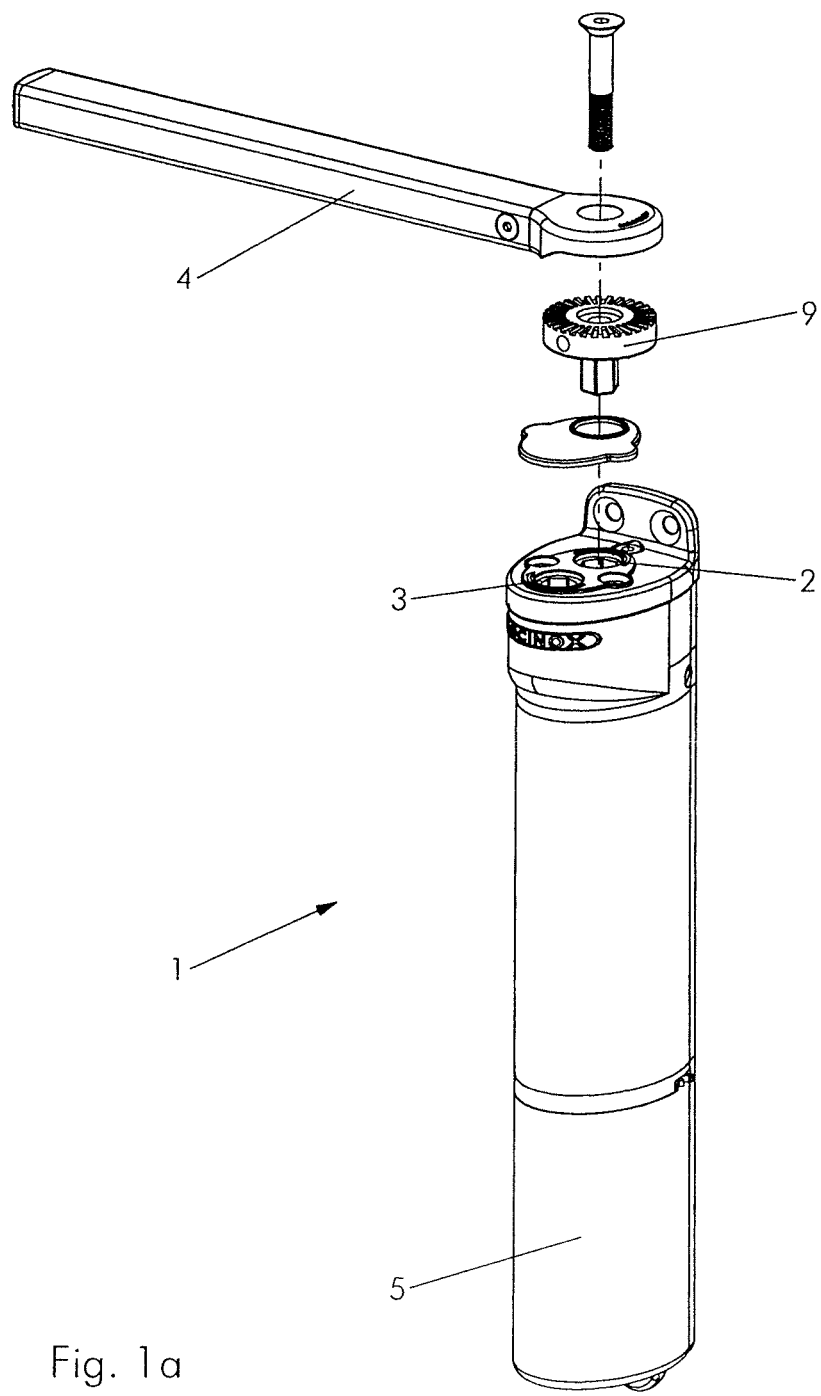
FIG. 1a is a perspective view of a rotational actuator according to a first embodiment of the invention.
Figure 2A:
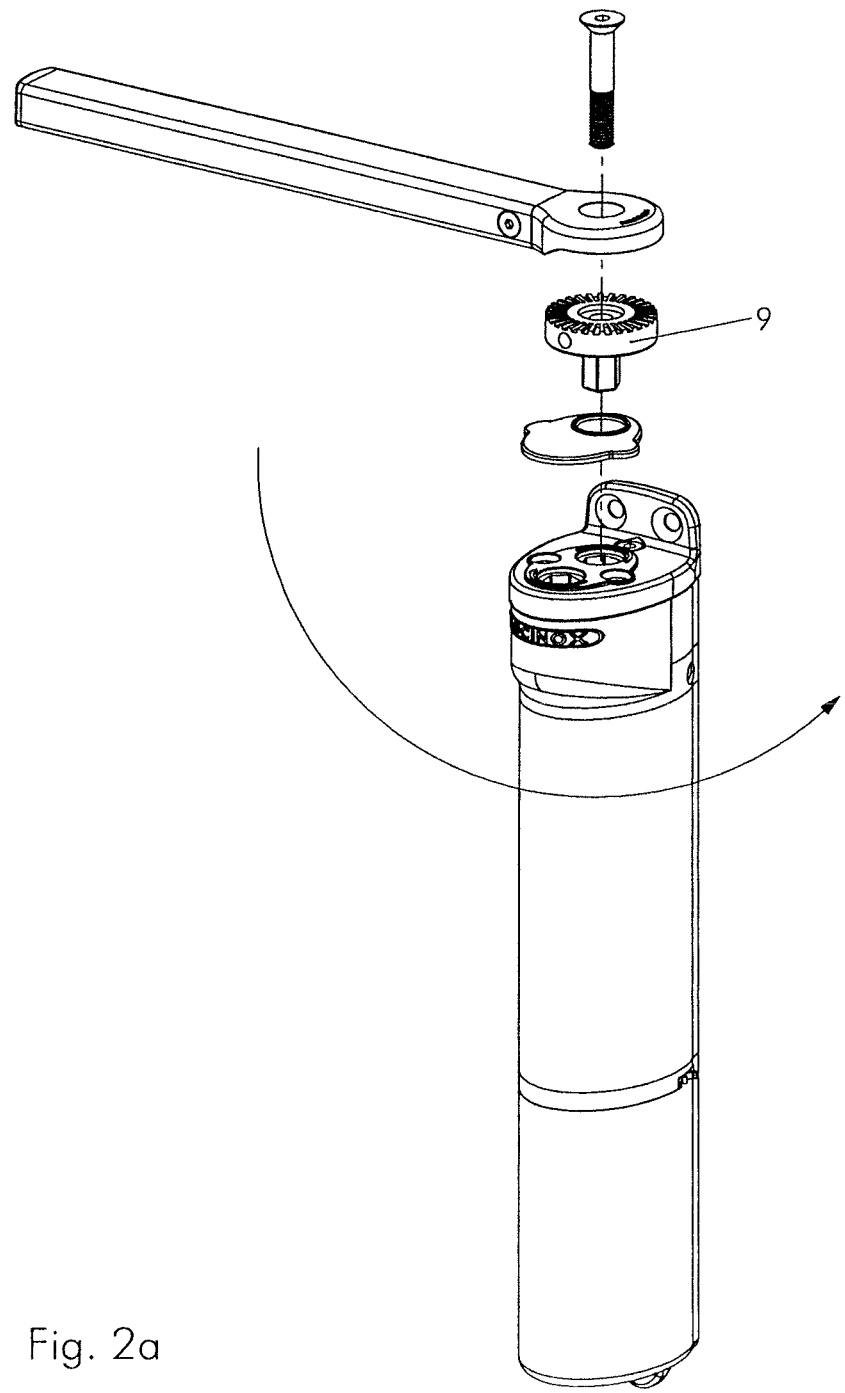
Figure 2B:
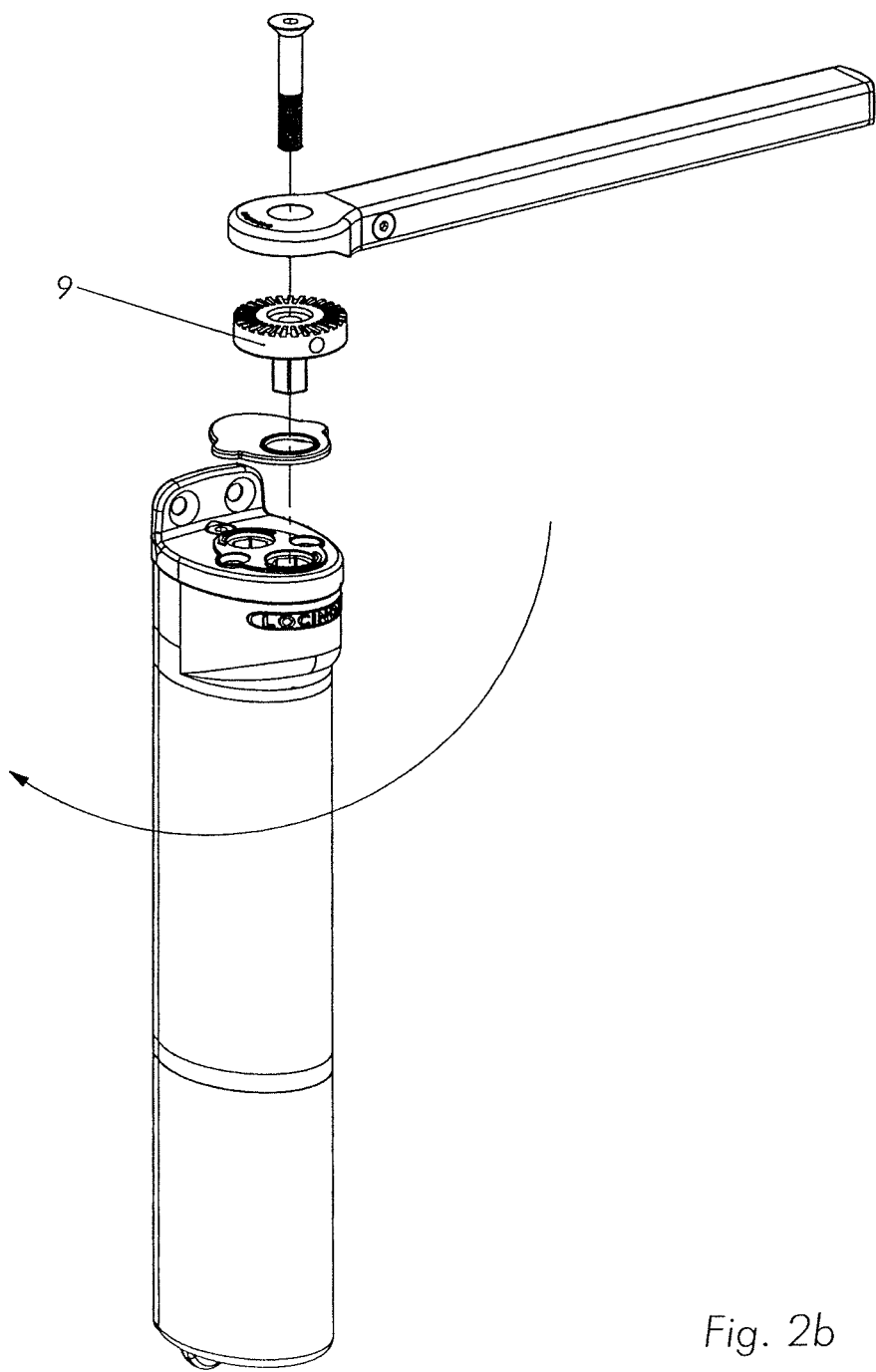
Figure 2D:
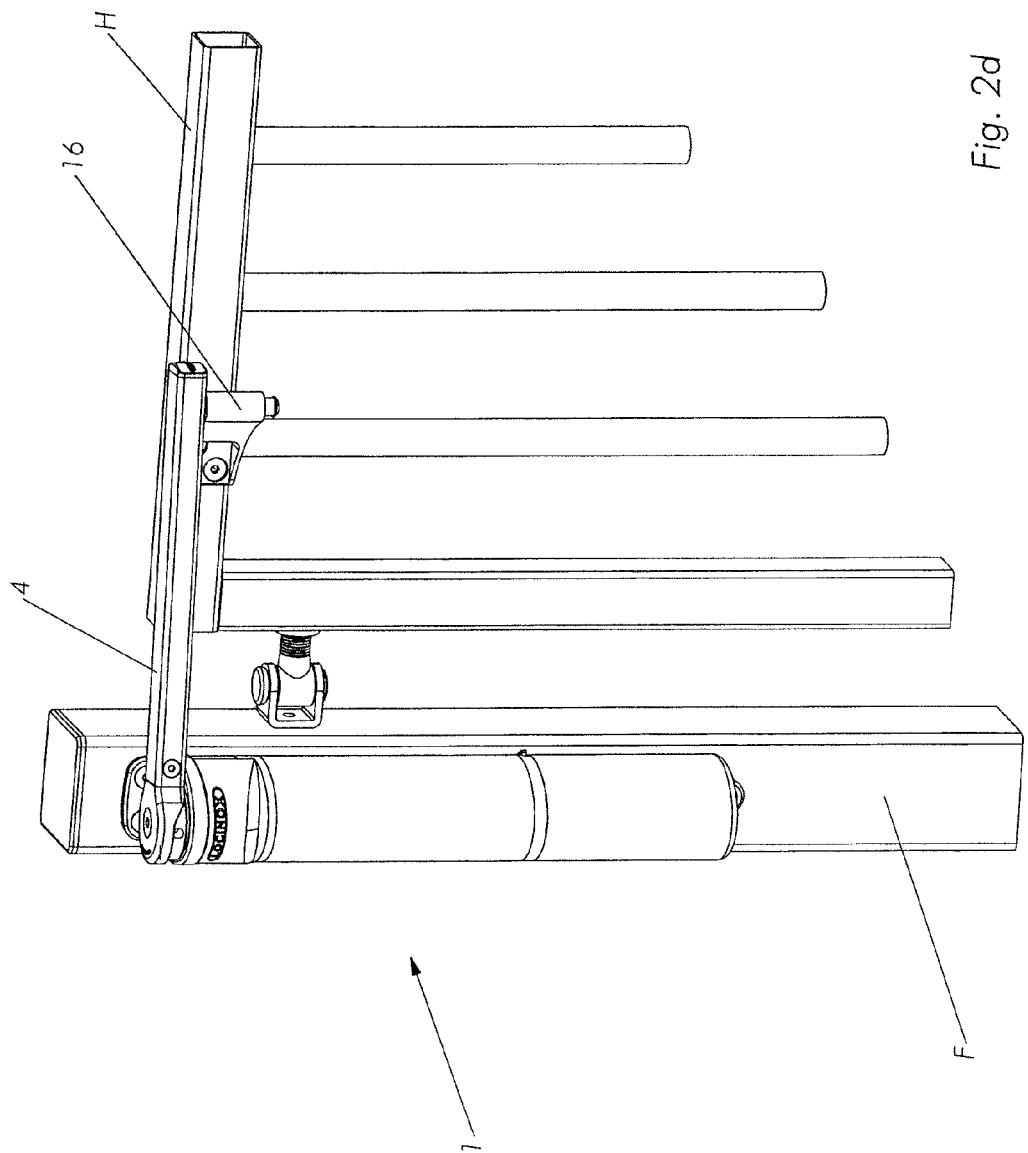

A first embodiment of an actuator according to the invention is illustrated in FIG. 1a. The illustrated actuator 1 is a rotational actuator with two alternative rotational outputs 2, 3, and an output arm 4 connectable to either one of said first rotational output 2 or second rotational output 3. Turning now to FIG. 1b, the first rotational output 2 is directly coupled to an output shaft 6, whereas the second rotational output 3 is coupled to said output shaft 6 over a reversing gearing 7. A torsion spring 8 is coupled to the output shaft 6 so as to urge it in a first, clockwise direction of rotation. In this manner, the output arm 4 will be urged in this first direction if it is coupled to the first output 2, as illustrated in FIG. 2a, and in an opposite, counter-clockwise direction if it is coupled to the second output 3 instead, as illustrated in FIG. 2b. Intermediate element 9 allows an adjustment of the angular position of the output arm 4 with respect to either output 2 or 3. The output arm 4 presents, on its underside, a linear guide (not illustrated) for engaging a roller 16. This rotational actuator 1 can thus be used as a closing mechanism for a closure member H, such as a door, gate, or wing, hinged to a fixed frame F. The rotational actuator 1 could be mounted on the fixed frame F, and the roller 16 fixed to the hinged member H. Alternatively, the output arm 4 could present a roller at a distal extremity, and a roller guide be mounted on the hinged member. Either way, the rotational actuator 1 could be adapted to right- or left-hand opening members by coupling the output arm 4 to either the first or second outputs 2, 3. In FIGS. 2c and 2d, the actuator 1 in, respectively, the arrangements of FIGS. 2a and 2b, is shown forming a closing mechanism interposed between a hinged member H and a fixed frame F. In both cases, a member carrying the roller 16 is fixed to the hinged member H, and the rotational actuator 1 is fixed to the fixed frame F. By this combination of roller and guide, the torque produced by the actuator 1 is efficiently converted into a closing force on the hinged member H with minimum friction losses.

Figure 3:
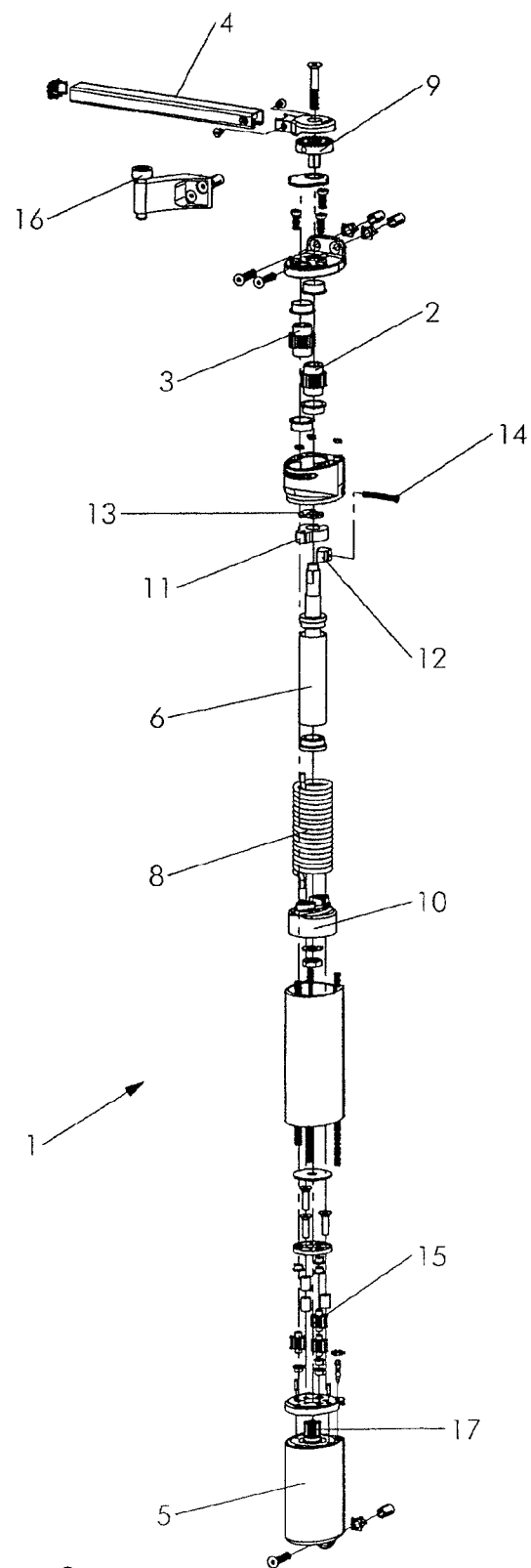
Figure 3A:
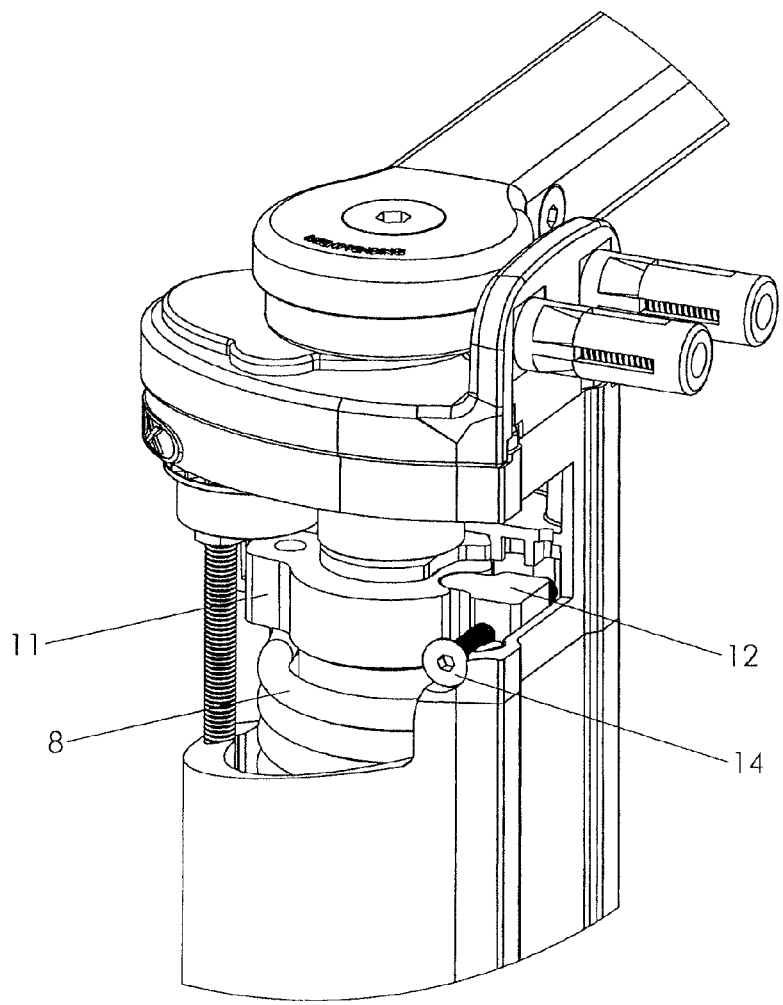
Figure 3B:
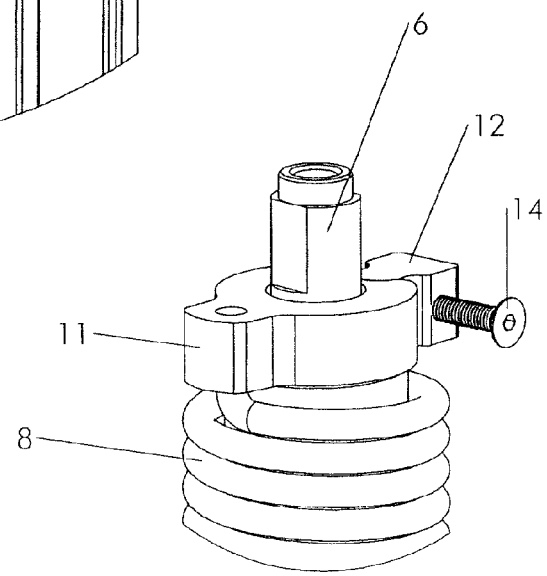
Figure 3C:
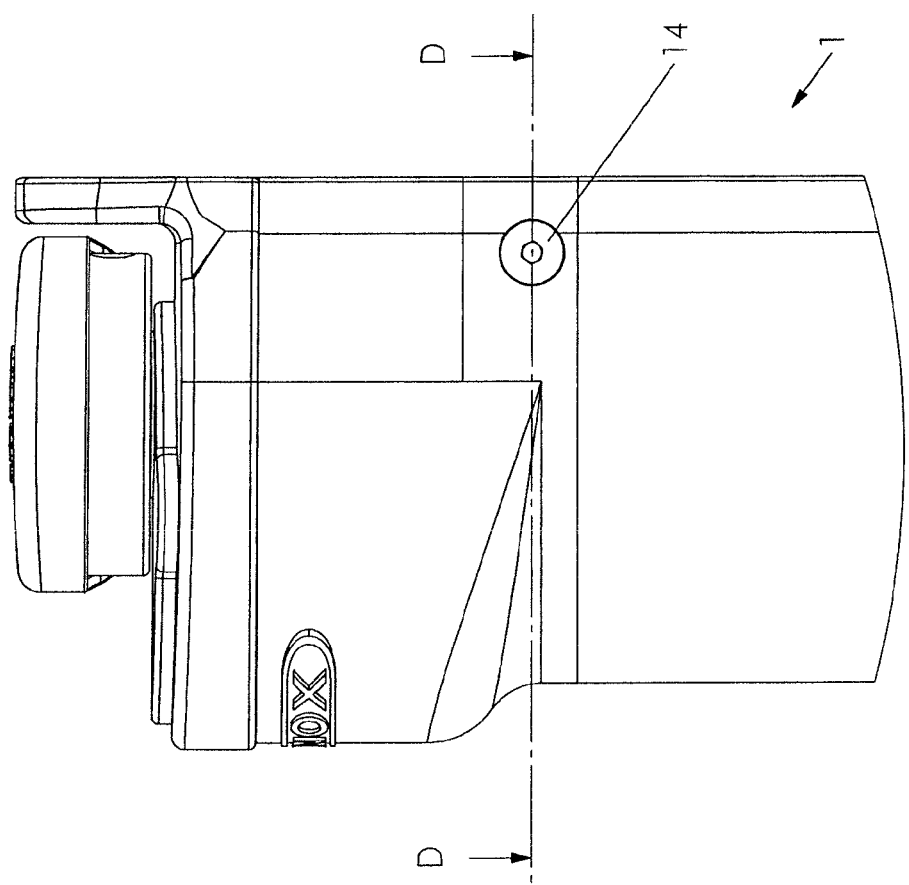

The output shaft 6 is also coupled to a hydraulic rotation damper 5 for damping its rotation in said first, clockwise direction. Turning now to FIG. 3, which shows an exploded view of the rotational actuator 1, the lower end of the output shaft 6 is coupled in rotation to a lower block 10, to which the lower end of the torsion spring 8 is also connected. The upper end of the torsion spring is connected to an upper block 11 in engagement with a finger 12. This is shown in detail in FIGS. 3a-3c. The upper end of the output shaft 6 is coupled in rotation to a cam plate 13, which rotation in said first direction is limited by a corresponding stop in the housing of the actuator 1. By varying the angular position in said housing of the upper block 11 through adjustment of said finger 12 over a screw 14, it is possible to adjust the preload the torsion spring 8, as shown in FIGS. 3d and 3e.

The lower block 10 is in the shape of an inverted cup, forming, on its inside, a ring gear in engagement with planet gears 15, which in turn engage a pinion 17 fixed to the damper shaft 22 of the hydraulic rotation damper 5 and acting as a sun gear. The rotation of the output shaft 6 is thus inversed and transmitted to the damper shaft 22 over a planetary gearing with a multiplication ratio of, for example, at least 1.5, preferably at least 2. In the illustrated actuator, the pinion 17 has 12 teeth, and the ring gear of the lower block 10 has 36 teeth, resulting in a multiplication ratio of 3.

Figure 4A:
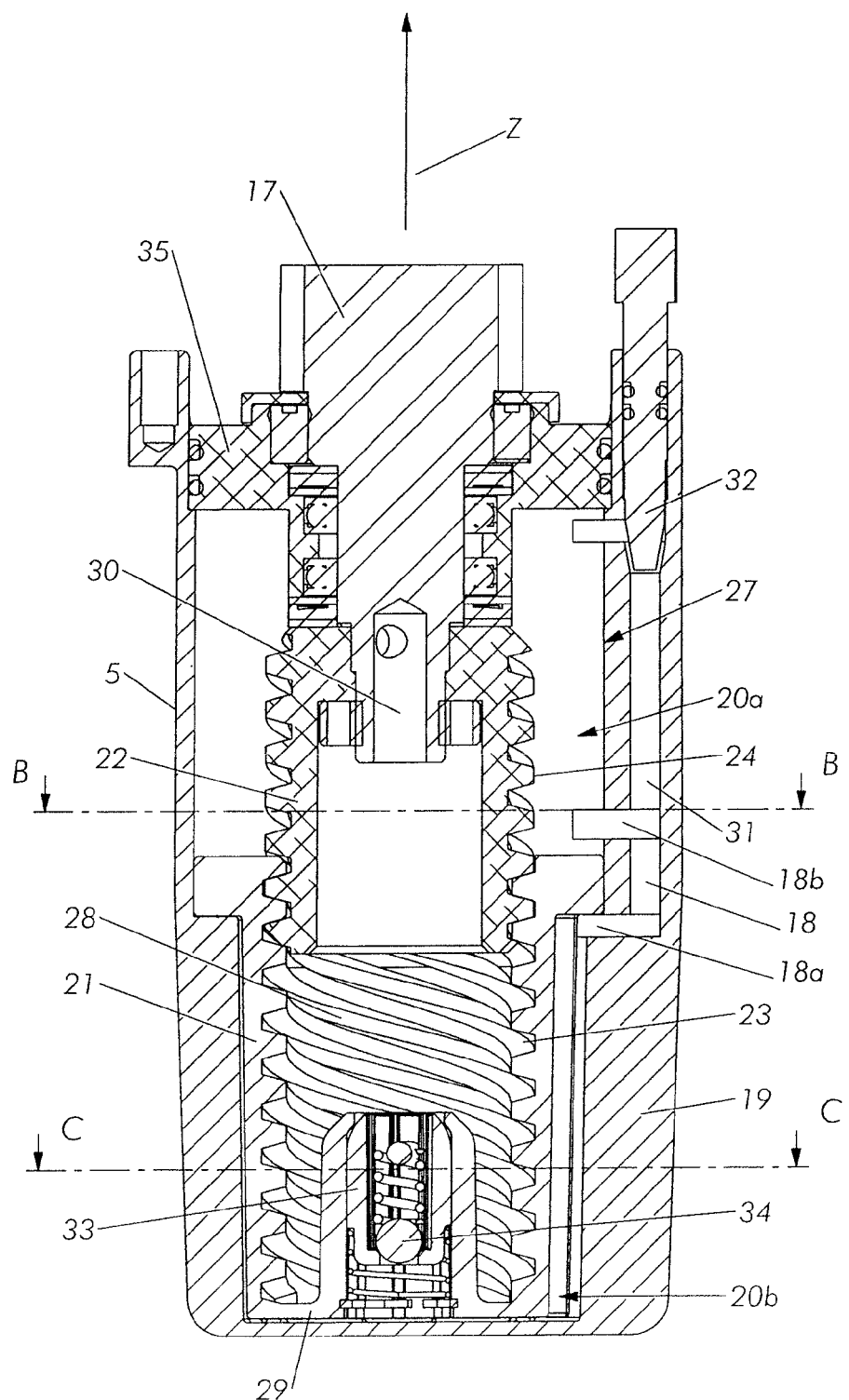

The hydraulic rotation damper 5 is illustrated in FIG. 4a. It comprises a cup-shaped cylinder barrel 19 which is completely closed at the bottom but open at its top. The open top of the cup-shaped cylinder barrel 19 is closed by means of a lid 35 to form a closed cylinder cavity 20. This cylinder cavity 20 is divided by a piston 21 into a first side 20a and a second side 20b. The damper shaft 22 is connected to the piston 21 and extends through an opening in the lid 35 out of the cylinder cavity 20 forming a sliding cylindrical joint. This sliding cylindrical joint is sealed off by means of a shaft seal (O-ring) applied around the damper shaft 22.

The piston 21 has a piston cavity 28 which has an inner helical thread 23 in engagement with a corresponding outer helical thread 24 on the damper shaft 22. The helical threads are multiple threads comprising in particular four threads. In this way, the step of the threads may be increased, in particular above 10 mm, for example to about 30 mm. The pitch of the threads is however so small with respect to the length of the threaded segment, that more than 1 rotation, preferably more than 1.5 rotation of the damper shaft is required to move the piston from its uppermost to its lowermost position. On its outer side, the piston 21 has a rotation-preventing member in the form of protrusions in engagement with a guide in the form of corresponding longitudinal grooves 25 on part of the inner surface of the cylinder barrel 19. By this means, a rotational movement of the damper shaft 22 is converted into a translational movement of the piston 21 within the cylinder barrel 19. A clockwise rotation of the damper shaft 22 will thus displace the piston 21 upwards, whereas a counter-clockwise rotation of the damper shaft will displace the piston 21 downwards. Alternative means are however at the reach of the skilled person. For instance, the helical threads could be instead on the piston 21 and the cylinder barrel 19, and the rotation-preventing member placed between the piston 21 and the damper shaft 22. Alternative rotation-preventing members, such as, for example, simple pin-and-groove systems, could also be considered according to the particular needs of the user.

The piston 21 further comprises, above said rotation-preventing member, an outer perimeter surface in a clearance fit with an inner perimeter surface 27 of the cylinder barrel 19 at 20° C. Compared to pistons provided with a seal, such a clearance fit considerably reduces friction losses. The clearance fit allows a restricted flow of the hydraulic fluid around the piston 21 and a controlled loss of pressure between the first and second sides 20a, 20b. It in particular also enables to use a less viscous hydraulic fluid which offers the advantage that it is easier to select a hydraulic fluid, the viscosity of which is less temperature dependent and thus more suitable for outdoor use. The hydraulic fluid is preferably a substantially viscostatic fluid.

To further reduce the influence of temperature variations in the damping torque of the damper 5, the piston 21 of the illustrated embodiment is in a synthetic material presenting a lower linear thermal expansion coefficient than the material (metal) of the cylinder barrel 19. The clearance between piston 21 and barrel 19 will thus decrease with increasing temperatures, compensating for the decrease in viscosity of the hydraulic fluid. From a certain temperature onwards, for example from a temperature which is higher 25° C., preferably higher than 30° C., but lower than 50° C., preferably lower than 45° C., the thermal expansion differential between piston 21 and barrel 19 may turn the clearance fit into a press fit. The friction between piston 21 and barrel 19 then further compensates for the higher fluidity of the hydraulic fluid.

In a test example of a hydraulic rotation damper 5 according to this embodiment of the invention, the cylinder barrel 19 has an internal diameter of 55 mm at 20° C., whereas the piston 21 has an external diameter of 54.97 mm. The cylinder barrel 19 is made of aluminium, whereas the piston is injection-moulded from a polyoxymethylene (POM) sold under the brand Hostaform® C9021. While the theoretical linear thermal expansion coefficient of aluminium is $2.310 \cdot 10^{-5}$ m/m·K and that of Hostaform® C9021 is $9 \cdot 10^{-5}$ m/m·K, our measurements at $-25°$ C., 20° C., and 60° C. have resulted in a real average thermal expansion coefficient $\alpha_{real}$ of $3.23 \cdot 10^{-5}$ m/m·K for the inner diameter of the aluminium cylinder barrel 19, and $6.215 \cdot 10^{-5}$ m/m·K for the Hostaform® piston 21. This is explained by the influence of the shapes of these parts, as well as, in the case of the piston 21, by the anisotropic properties of this injection-moulded part. Since during the injection-moulding of the piston 21 the material flows in a significantly longitudinal direction, the piston 21 presents significantly different properties in that direction and in a perpendicular plane.

Table 1 shows the different diameters of the barrel 19 and piston 21 at $-25°$ C., 20° C. and 60° C., as well as their resulting real average thermal expansion coefficients $\alpha_{real}$. The thermal expansion coefficient is calculated on the basis of the formula:

$$\varnothing_{20+\Delta T} = \varnothing_{20} \times [1+(\alpha \times \Delta T)].$$

TABLE 1

Comparative thermal expansion of cylinder 21 and barrel 19

| | $\varnothing_{-25}$ at $-25°$ C. [mm] | $\varnothing_{20}$ at 20° C. [mm] | $\varnothing_{60}$ at 60° C. [mm] | $\alpha_{real}$ [$10^{-5}$ m/m · K] |
|---|---|---|---|---|
| Barrel | 54.92 | 55 | 55.07 | 3.23 |
| Piston | 54.82 | 54.97 | 55.11 | 6.215 |

In this test example, the hydraulic fluid used has been a hydraulic fluid sold under the brand Dow Corning® 200(R) 100cSt. Table 2 presents the clearance cross-section areas (in a plane perpendicular to the longitudinal axis of the cylinder cavity) between barrel 19 and piston 21 besides the viscosity values for this fluid at various temperatures. The clearance cross-section areas at 10 and 30° C. have been calculated based on the above mentioned formula and the average thermal expansion coefficients $\alpha_{real}$. They are respectively about 53% larger and about 53% smaller than the clearance cross-section area at 20° C. This percentage can be adjusted by choosing another material, having another thermal expansion coefficient, for the cylinder barrel and/or for the piston, or also by increasing or reducing the clearance between the piston and the cylinder barrel.

TABLE 2

Evolution of clearance area and viscosity with temperature

| | Clearance area [mm²] | Viscosity [cSt] |
|---|---|---|
| $-25°$ C. | 8.619 | 400 |
| 10° C. | 3.971 | |
| 20° C. | 2.591 | 100 |
| 30° C. | 1.210 | |
| 60° C. | $-3.461$ | 50 |

As can be seen from Table 2, at low temperatures the increase of the hydraulic fluid's viscosity is compensated by an almost proportional increase in the area through which the hydraulic fluid may flow around the piston 21. On the other hand, the "negative" clearance at 60° C. indicates that at that temperature the piston 21 is in a press fit with the barrel 19.

The present test example transitions from a clearance fit to a press fit at around 37° C. From that temperature onwards, the lower viscosity of the fluid is also compensated by an increasing friction between piston 21 and barrel 19. The elasticity and high resistance against constant stresses shown by synthetic materials, and in particular by the POM used in the example ensures that, even after longer periods in a press fit with the barrel 19, the piston 21 will recover its original shape after cooling.

The cavity 28 of the piston 21 is closed at its lower end to form the piston bottom 29 dividing the cylinder cavity 20 into a first, upper side 20a and a second, lower side 20b. This cavity 28 is connected by a substantially unrestricted fluid duct 30 in the damper shaft 22 to the remaining part of the first side 20a of the cylinder cavity 20 so that pressure in the cavity 28 is substantially the same as the pressure in the remaining part of the first side 20a of the cylinder cavity 20.

The first and second sides 20a, 20b of the cylinder cavity 20 are connected by a fluid passage 31, restricted by a needle valve 32, accessible through an orifice opening at the top of the cylinder barrel 19 for adjusting its resistance to hydraulic fluid flow between the first and second sides 20a, 20b, and therefore the damping characteristics of the rotation damper 5. The needle of the needle valve 32 is sealed by means of a shaft seal (O-ring) in the orifice opening.

The illustrated rotation damper 5 is substantially unidirectional, opposing a substantially higher torque resistance to a counter-clockwise rotation of the damper shaft 22 (lowering of the piston) than to a clockwise rotation of the same damper shaft 22 (raising of the piston) at the same speed. For this purpose, the rotation damper 5 comprises a further fluid duct connecting the first and second sides 20a and 20b of the cylinder cavity 20. This further duct is not provided with a needle valve but instead with a one-way valve 33 allowing hydraulic fluid flow from said first side 20a to said second side 20b of the cylinder cavity 20. Therefore, when the damper shaft 22 rotates in a counter-clockwise direction in respect to the axis Z, and the piston 21 travels downwards, the one-way valve 33 will stay closed, and the rotation damper 5 will oppose a significantly higher torque against this movement than when the damper shaft 22 rotates in a clockwise direction and the piston 21 travels upwards, in which case the one-way valve 33 will open, letting the hydraulic fluid flow from the first side 20a to said second side 20b.

In the illustrated embodiment, the rotation damper 5 comprises, within the body of the one-way valve 33, yet another duct connecting the first and second sides 20a and 20b of the cylinder cavity. This duct comprises a relief valve 34 allowing flow of hydraulic fluid from the second side 20b to the first side 20a only when the pressure inside the second side 20b becomes too high, i.e. when it exceeds a safety threshold level. This valve is thus a safety valve which prevents damage to the mechanism, for example when a person or the wind exerts an extra force onto a door or gate connected to this rotation damper 5 to close it. In this case, opening of the valve allows a higher closing speed (forced closing of the hinged member) and thus prevents high stresses in the rotation actuator and in the arm linking it to the hinged member. In the illustrated embodiment, both the one-way valve 33 and the relief or safety valve 34 are provided in ducts in the piston bottom 29, between the second side 20b and the piston cavity 28. However, alternative configurations and locations of this valve system are within the reach of the skilled person, for instance with separate valves, of which at least one could possibly be located in the cylinder barrel 19, according to the user requirements.

The fluid passage 31 also comprises a bypass 18 between a first, lower point 18a of the cylinder cavity 20, and a second, higher point 18b of the cylinder cavity 20. For most of the travel of the piston 21, both first and second points 18a, 18b will be below the piston 21, and thus on the same second, high pressure side 20b of the cylinder cavity 20, as shown in FIGS. 7a and 7b. However, when the piston 21 travels below the second point 18b, the bypass 18 will allow hydraulic fluid to bypass the needle valve 32, as shown in FIG. 7c, reducing (or even releasing) the overpressure in the second side 20b and reducing the damping torque of the hydraulic rotation damper 5. As the angular position of the output arm 4 with respect to the first or second output 2, 3 is adjustable, a user can adjust at which angular position of the output arm 4 this release of the damping torque will take place, or even cancel it altogether.

Due to the presence of the one-way valve 33, the highest hydraulic fluid pressures will be reached in the second side 20b of the cylinder 20. Because the cylinder barrel 19 is cup-shaped, and completely closed at the bottom, in particular in the second, high pressure side 20b of the cylinder cavity 20, the illustrated hydraulic rotation damper 5 cannot leak, even when it is filled with a relatively low viscous hydraulic fluid which is particularly suited for outdoors applications, such as gate closing mechanisms. With the expression "completely closed in the second side of the cylinder cavity 20" is meant that the cylinder barrel does not have any opening allowing flow of fluid from said high-pressure second side 20b of the cylinder cavity 20 out of the damper. Although not preferred, it is also possible in the damper of the present invention to provide joints in the cylinder barrel 19 in the second side 20b of the cylinder cavity 20, but only in so far as those joints are not sliding joints between parts relatively movable tangentially to a joint surface. In an alternative embodiment, the bottom of the cylinder barrel could thus be a separate part affixed against the substantially cylindrical portion of the cylinder barrel, with a static seal pressed within the non-sliding joint formed between these two components. It is also possible to make a hole in the cylinder barrel for filling the cylinder cavity with the hydraulic fluid, and to close this hole in a completely fluid-tight manner by means of a screw plug.

Turning to FIGS. 6a to 6d, if the damper shaft 22 is rotated by an external torque in a clockwise direction around axis Z, the piston 21 will move upwards. Since the one-way valve 33 is set to open at a pressure at the first side 20a of the cylinder 20 higher than that of the second side 20, hydraulic fluid will flow from the first side 20a, through said piston cavity 28 and one-way valve 33, to the second side 20b, as shown in FIGS. 6b, 6d, and the rotation damper 5 will only oppose a small resistance to this movement. If the damper shaft is rotated in the opposite, counter-clockwise direction around axis Z, as shown in FIGS. 7a-7c, the piston 21 will move downwards. Since the one-way valve 33 will now remain closed, the hydraulic fluid will flow back from the second side 20b to the first side 20a only through the restricted duct 31, and the rotation damper 5 will thus oppose a higher resistance to this return movement.

FIGS. 8a-13b illustrate a second embodiment of the invention in the form of a linear actuator 49 with the same rotation damper 5.

Figure 9:
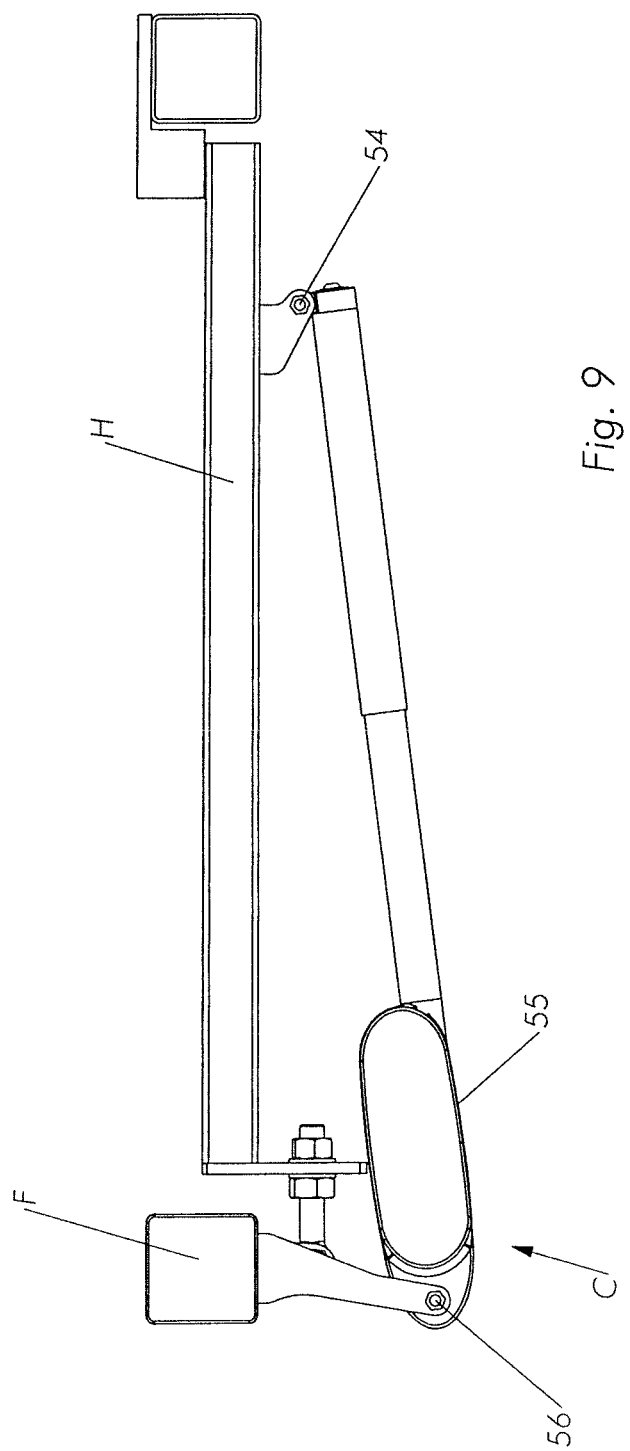
FIGS. 9-10 are top views of a gate closing mechanism with the actuator of FIGS. 8a-8b.
Figure 10:
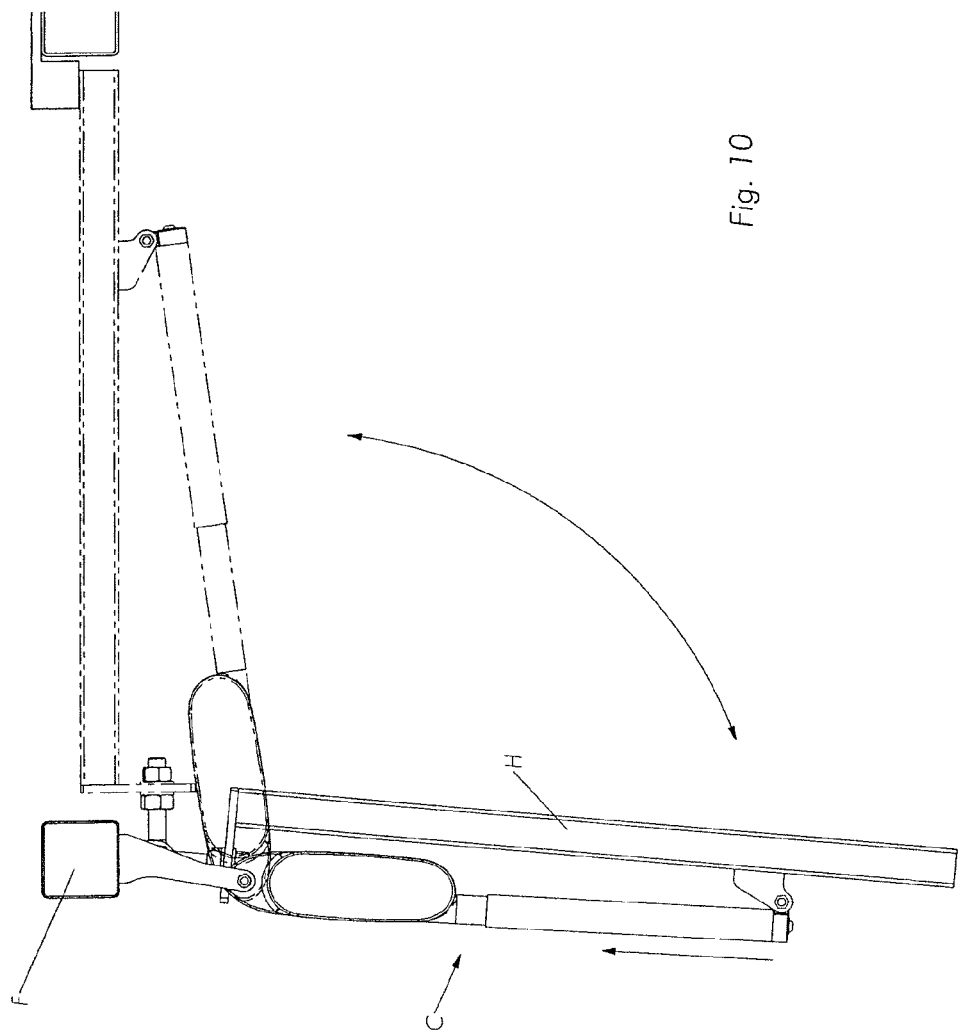
Figure 11:
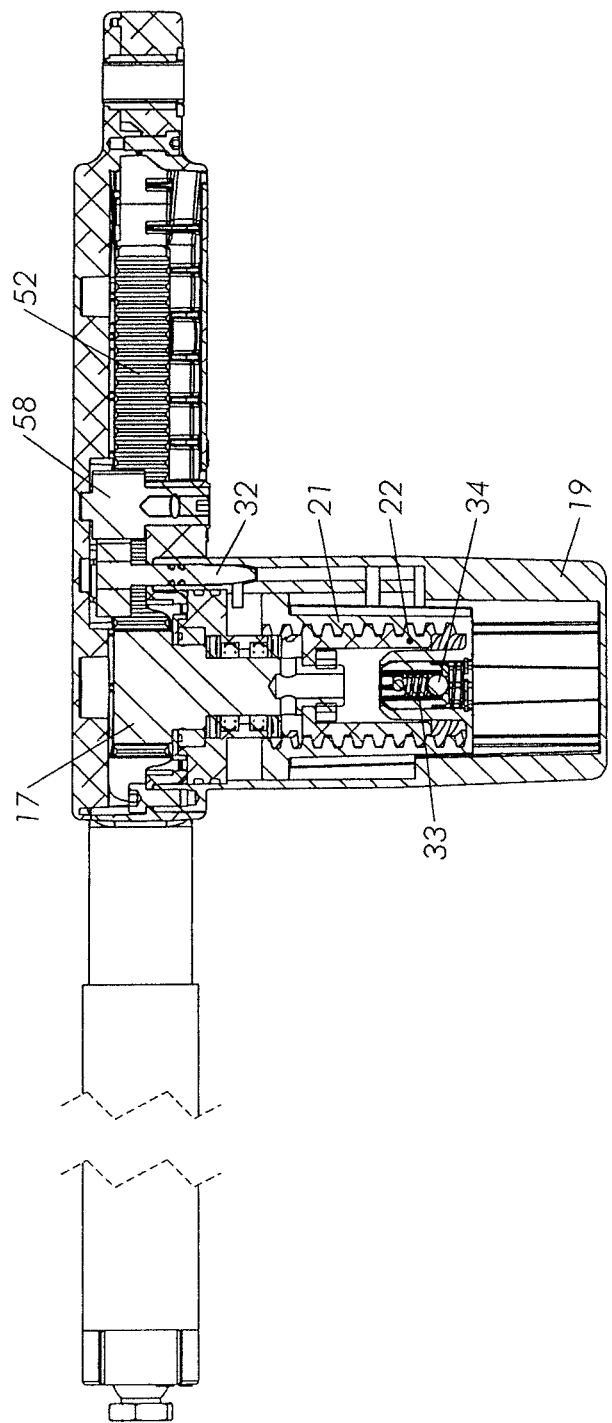
FIG. 11 is a detail cut view of the actuator of FIGS. 8a and 8b.
Figure 12:
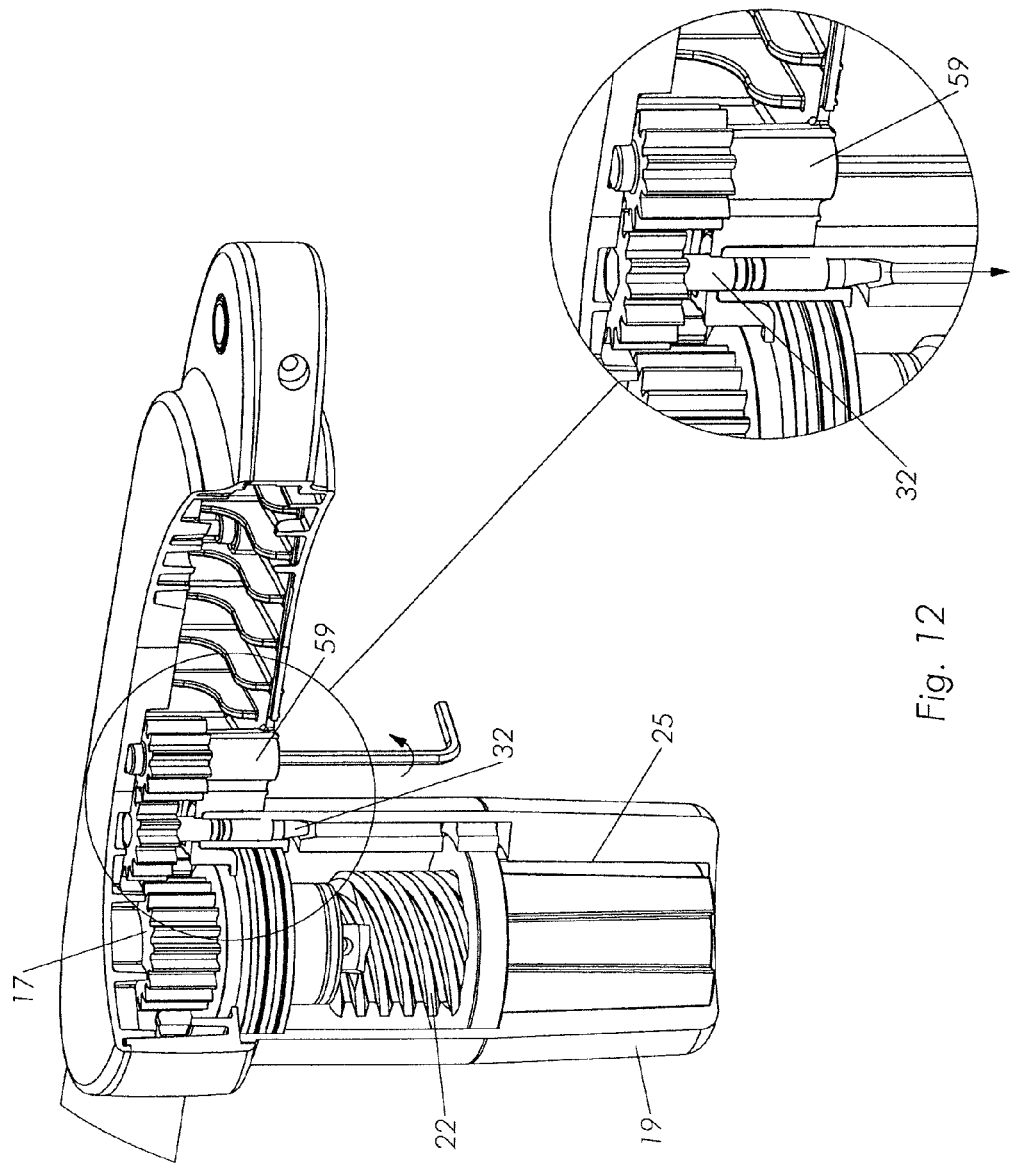
FIG. 12 is a detail perspective view of the actuator of FIGS. 8a and 8b.
Figure 12B:
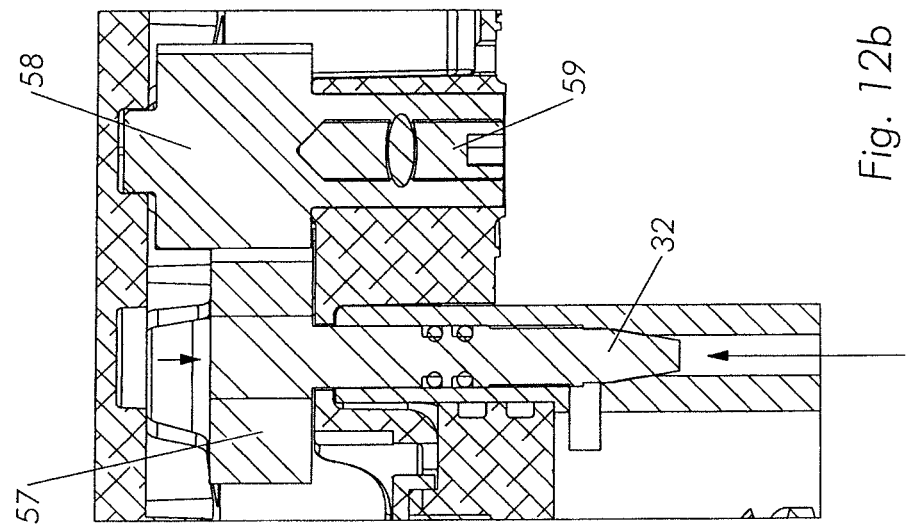
FIGS. 12a, 12b are detail cut views of the actuator of FIGS. 8a and 8b.
Figure 12A:
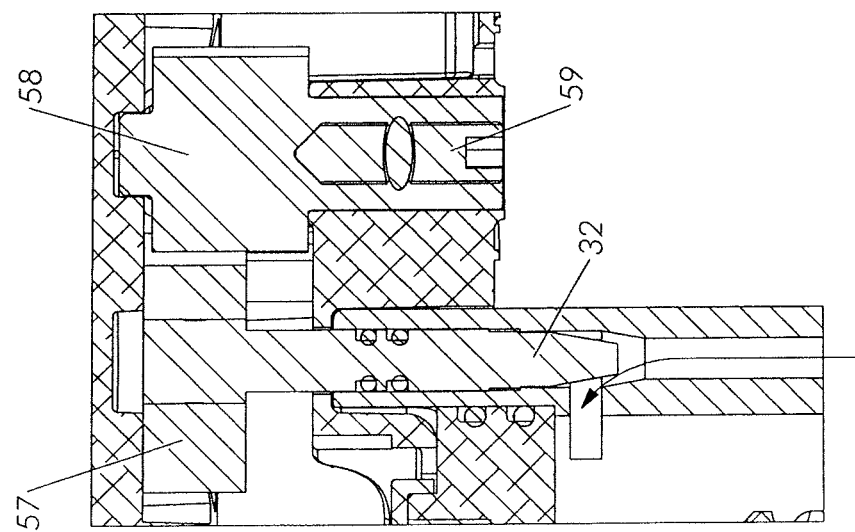

The linear actuator 49 comprises a pushrod 50, a resilient element 51, in this particular embodiment in the form of a pressure coil spring, urging the pushrod 50 in an outwards direction along axis X, rotation damper 5, and a motion-converting mechanism, formed in this particular embodiment by a rack 52 formed on said pushrod 50 and a pinion 17, topping the damper shaft 22 and in engagement with said rack 52. A linear movement of the pushrod 50 in said outwards direction is converted into a counter-clockwise rotation of the damper shaft 22 around the axis Z, and thus in a downwards, highly damped motion of the piston 21. The opposite movement of the pushrod 50 will however be only slightly damped, since the piston 21 will move upwards. This linear actuator 49 can be for instance used in a telescopic closing mechanism C such as is illustrated in FIGS. 9, 10, with a first pivot 54 at the distal end of the pushrod 50, and a housing 55 with an opposite second pivot 56, wherein said first and second pivots 39, 41 can be used to connect the closing mechanism C to, respectively, one or the other of a hinged member H or fixed frame F, as illustrated in FIGS. 9, 10. Such closing mechanisms C can be used for hinged members opening in either direction: opening the hinged member H will always result in a contraction of the closing mechanism C and closing it in an extension. As Since the housing 55 is fixed to the top of cylinder barrel 19, the needle valve 32 is not directly accessible. Instead, as seen in particular in FIGS. 12 and 13a-b, it is coupled to a gearwheel 57 in engagement with a pinion 58 coupled to a small shaft 59 accessible from the bottom of the housing 55 to adjust said needle valve 32.

Table 3 presents closing times at various temperatures of an example of such a linear actuator 49 comprising the above-mentioned test example of the rotation damper 5, with an aluminium barrel 19, a piston 21 injection-moulded from Hostaform® C9021, and Dow Corning® 200(R) 100Cst hydraulic fluid.

TABLE 3

Temperature and closing time

| Temperature [° C.] | −25 | 20 | 60 |
|---|---|---|---|
| Time [s] | 8 | 10 | 11 |

As can be seen in this table, despite the eight-fold decrease in viscosity of this hydraulic fluid over this 85 K temperature range, this example of the linear actuator 49 is actually slightly more strongly damped at high temperatures than at low ones.

Although the present invention has been described with reference to specific exemplary embodiments, it will be evident that various modifications and changes may be made to these embodiments without departing from the broader scope of the invention as set forth in the claims. Accordingly, the description and drawings are to be regarded in an illustrative sense rather than a restrictive sense.

The invention claimed is:

1. A closing mechanism for a hinged member hinged to a structure, which closing mechanism comprises an actuator comprising:
   an output member arranged to be connected to said hinged member;
   a resilient element connected to said output member so as to urge the output member in a first direction to close said hinged member; and
   an hydraulic rotation damper;
   which comprises:
      a closed cylinder cavity within a cylinder barrel;
      a rotational damper shaft which extends into the cylinder cavity;
      a piston dividing the cylinder cavity into a first side and a second side, and comprising:
         at least one helical thread in engagement with a corresponding thread on the damper shaft, and
         a rotation-preventing member in engagement with a guide for said rotation-preventing member on said cylinder barrel, so that, by cooperation of the helical thread on the piston with the corresponding thread on the damper, a rotational motion of the shaft with respect to the cylinder barrel results in a translational motion of the piston along a longitudinal axis of the shaft; and
      a restricted fluid passage between said first and second sides;
   said damper shaft being connected over a gearing to the output member and the resilient element of the actuator for damping movement of said output member in said first direction.

2. The closing mechanism as claimed in claim 1, wherein said output member is a rotational output shaft, said resilient element being connected to said output shaft so as to urge the output shaft in said first direction around an axis of rotation.

3. The closing mechanism as claimed in claim 2, further comprising a first rotational output directly connected to said output member, and a second rotational output connected to said output member and said first output over a reversing gearing.

4. The closing mechanism as claimed in claim 3, further comprising an output arm connectable to either one of said first or second rotational outputs.

5. The closing mechanism as claimed in claim 2, wherein the gearing between the output member and the damper shaft has a multiplying ratio.

6. The closing mechanism as claimed in claim 5, wherein said multiplying ratio comprises at least 1.5.

7. The closing mechanism as claimed in claim 6, wherein said multiplying ratio comprises at least 2.

8. The closing mechanism as claimed in claim 5, wherein said gearing is a planetary gearing.

9. The closing mechanism as claimed in claim 1, wherein said output member is a pushrod, said resilient element being connected to said pushrod so as to urge the pushrod in said first direction along an axis of translation, and said output member being connected to said damper shaft over a rack-and-pinion gearing.

10. The closing mechanism as claimed in claim 9, wherein said rack-and-pinion gearing is arranged to provide a multiplying ratio of at least 1.5, between a swinging motion of the hinged member and a rotation of the damper shaft.

11. The closing mechanism as claimed in claim 10, wherein said multiplying ratio comprises at least 2.

12. The closing mechanism as claimed in claim 1, wherein said fluid passage between the first and second sides of the cylinder cavity comprises an adjustable flow restrictor.

13. The closing mechanism as claimed in claim 1, wherein said cylinder barrel has a top and a bottom, said rotational damper shaft extending into the cylinder cavity through an opening at said top of the cylinder barrel, the bottom being substantially closed, said first side of the cylinder cavity being above the piston, and said second side of the cylinder cavity being below the piston, and further comprising a duct which connects said first side of the cylinder cavity with said second side of the cylinder cavity and which is provided with a one-way valve allowing fluid flow from said first side to said second side of the cylinder cavity.

14. The closing mechanism as claimed in claim 13, further comprising a relief valve from said second side to said first side of the cylinder cavity, set to open when an overpressure in said second side exceeds a predetermined threshold, and close again once said overpressure falls back under said predetermined threshold or under a threshold which is lower than said predetermined threshold.

15. The closing mechanism as claimed in claim 13, wherein said fluid passage between the first and second sides of the cylinder cavity comprises a flow restrictor adjustable through an orifice in the cylinder barrel, wherein said second side of the cylinder cavity and said orifice are at opposite sides of the flow restrictor.

16. The closing mechanism as claimed in claim 15, wherein said orifice opens towards said top of the cylinder barrel.

17. The closing mechanism as claimed in claim 13, wherein said fluid passage comprises a bypass from a first point of said cylinder cavity to a second point of said cylinder cavity, around said flow restrictor, said first point being situated at a lower level than said second point.

18. The closing mechanism as claimed in claim 1, wherein, at least at 20° C., an outer perimeter surface of said piston presents a clearance fit with an inner perimeter surface of the cylinder barrel to allow hydraulic fluid contained in the cylinder cavity to flow through said clearance between the piston and the cylinder barrel, with said cylinder barrel being made of at least one first material, having a first thermal expansion coefficient, and said piston of at least one second material, having a second thermal expansion coefficient, said second thermal expansion coefficient being larger than said first thermal expansion coefficient so that said clearance decreases when the temperature of the damper is raised and increases when the temperature of the damper is lowered.

19. The closing mechanism as claimed in claim 12 or 15, wherein said adjustable flow restrictor comprises a needle valve.

* * * * *